United States Patent
Miyagi

(10) Patent No.: US 9,681,022 B2
(45) Date of Patent: Jun. 13, 2017

(54) IMAGE PROCESSING APPARATUS, IMAGE PROCESSING METHOD, AND RECORDING MEDIUM

(71) Applicant: Noriko Miyagi, Kanagawa (JP)

(72) Inventor: Noriko Miyagi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/963,310

(22) Filed: Dec. 9, 2015

(65) Prior Publication Data

US 2016/0191744 A1    Jun. 30, 2016

(30) Foreign Application Priority Data

Dec. 25, 2014 (JP) ................................. 2014-263689
Oct. 6, 2015  (JP) ................................. 2015-198477

(51) Int. Cl.
| | | |
|---|---|---|
| H04N 1/387 | (2006.01) | |
| H04N 1/58  | (2006.01) | |
| H04N 1/00  | (2006.01) | |
| H04N 1/23  | (2006.01) | |
| H04N 1/60  | (2006.01) | |

(52) U.S. Cl.
CPC ......... *H04N 1/387* (2013.01); *H04N 1/00809* (2013.01); *H04N 1/2307* (2013.01); *H04N 1/58* (2013.01); *H04N 1/3878* (2013.01); *H04N 1/6072* (2013.01); *H04N 2201/0094* (2013.01)

(58) Field of Classification Search
CPC .................................................... H04N 1/387
See application file for complete search history.

(56) References Cited

U.S. PATENT DOCUMENTS

| | | | | |
|---|---|---|---|---|
| 5,374,996 A | * | 12/1994 | Eguchi ...................... | G06T 7/20 358/3.23 |
| 2002/0031263 A1 | | 3/2002 | Yamakawa | |
| 2009/0097776 A1 | | 4/2009 | Fukamachi et al. | |
| 2009/0208126 A1 | * | 8/2009 | Matsumoto ............ | H04N 19/60 382/244 |
| 2013/0063745 A1 | * | 3/2013 | Tecu .................. | H04N 1/00392 358/1.13 |

FOREIGN PATENT DOCUMENTS

| | | |
|---|---|---|
| JP | 2007-235609 | 9/2007 |
| JP | 2008-042438 | 2/2008 |
| JP | 2013-066153 | 4/2013 |

OTHER PUBLICATIONS

Extended European Search Report for corresponding European Application No. 15199088.4 dated May 10, 2016.

* cited by examiner

*Primary Examiner* — Ibrahim Siddo

(74) *Attorney, Agent, or Firm* — Harness, Dickey & Pierce, P.L.C.

(57) ABSTRACT

An image processing apparatus includes a geometric correction unit to generate a plurality of pieces of pixel value corrected image data having different pixel values based on object information of input image data, a synthesizer to select a pixel value to be applied to each pixel from the plurality of pieces of pixel value corrected image data to generate corrected image synthesized data, and a pseudo grayscale processor to perform a pseudo grayscale process on the corrected image synthesized data.

12 Claims, 20 Drawing Sheets

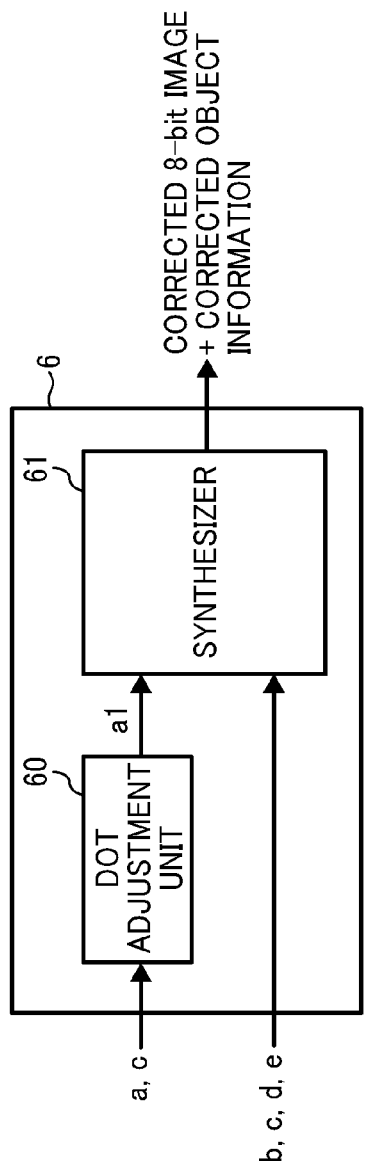

PIXEL VALUE OF 8-bit IMAGE

OBJECT INFORMATION

AFTER FOREGROUND/BACKGROUND
BINARIZATION

COLORED BACKGROUND / BLACK CHARACTER

AFTER PSEUDO
GRAYSCALE PROCESS

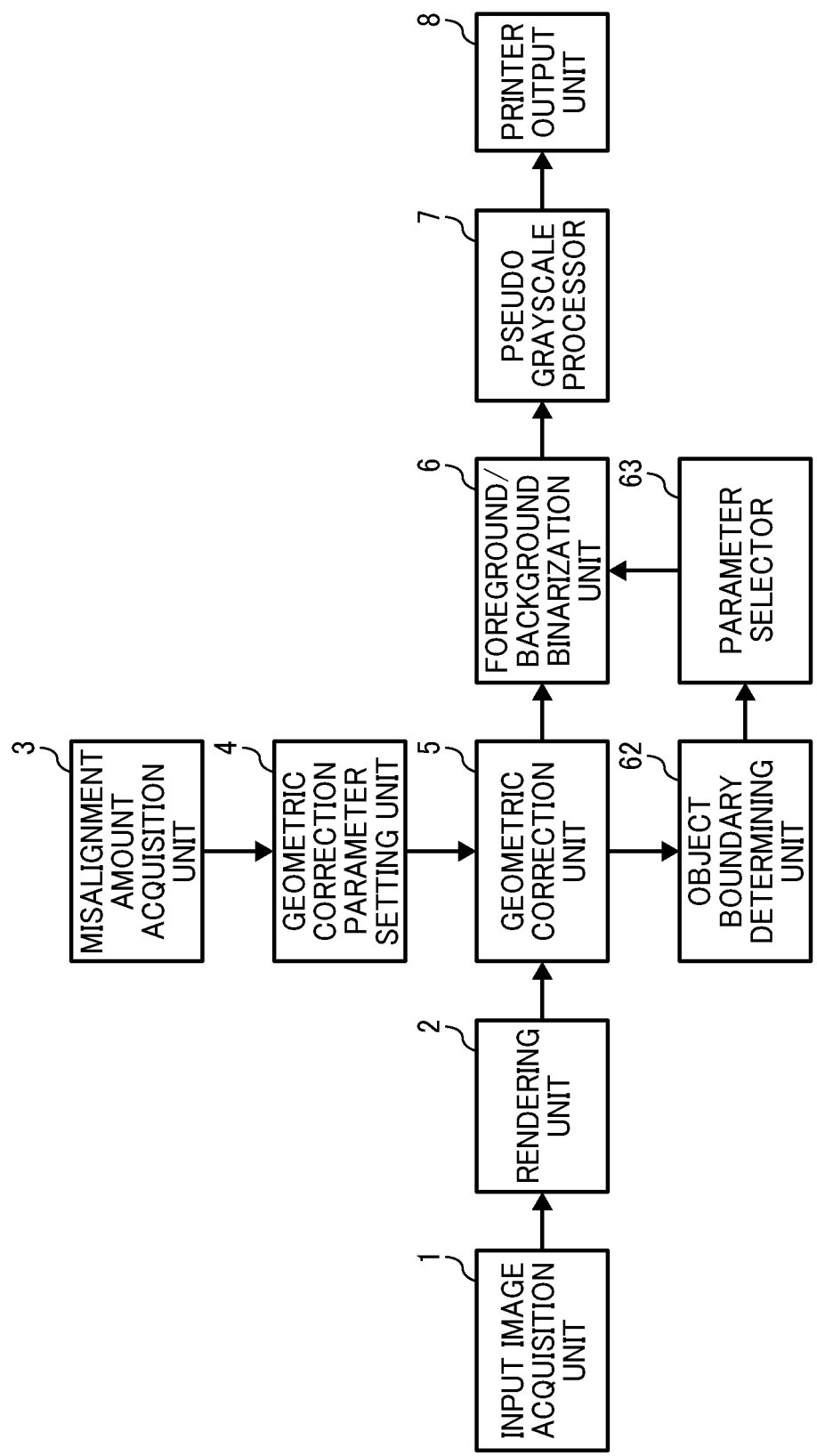

FIG. 22A 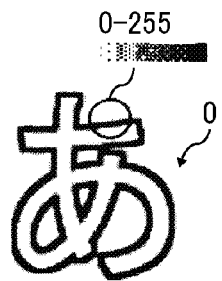 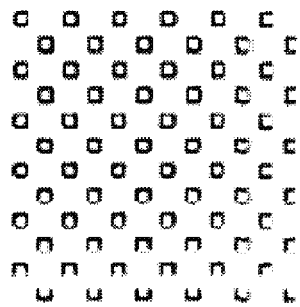
FIG. 22B 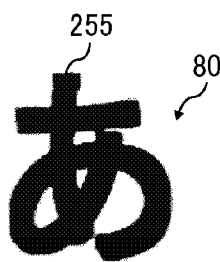 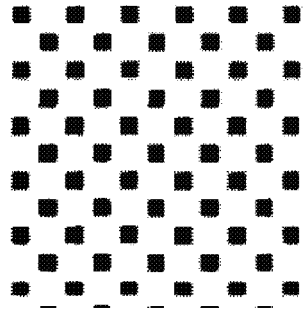
FIG. 22C 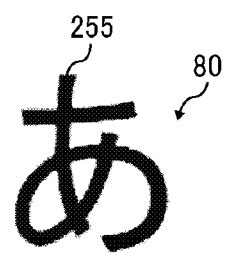 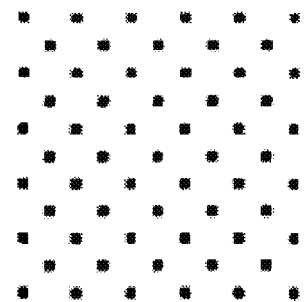
FIG. 23
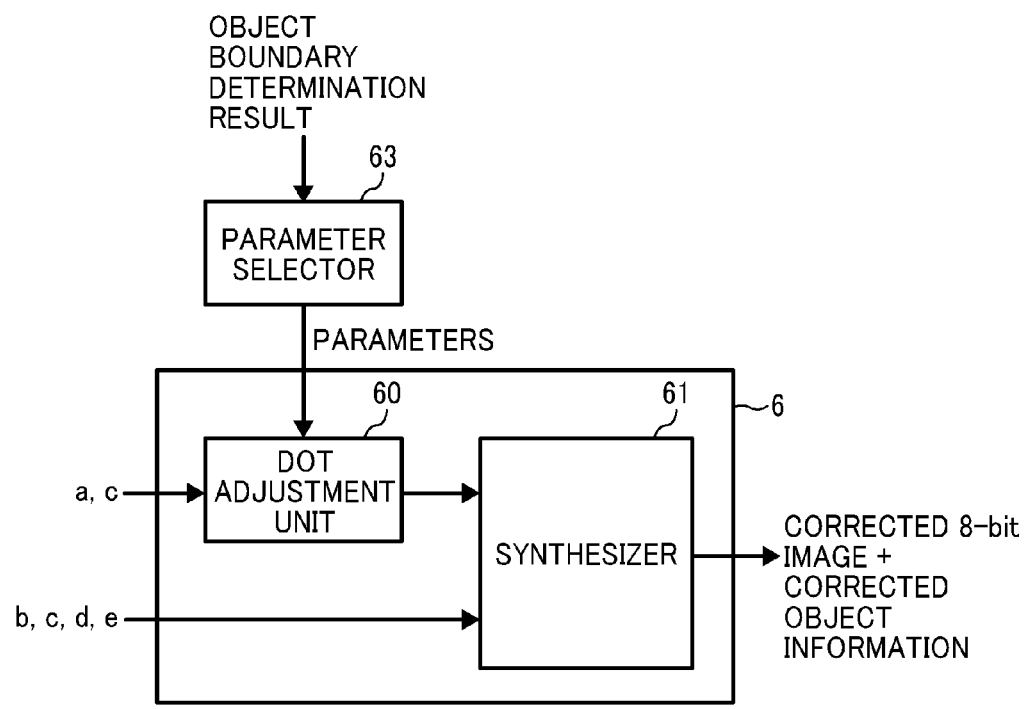

FIG. 26

VERTICAL LINE SCREEN

| Dit (x%64) | Dit (x%64 +1) |
|---|---|
| Dit (x%64) | Dit (x%64 +1) |

HORIZONTAL LINE SCREEN

| Dit (y%64) | Dit (y%64 +1) |
|---|---|
| Dit (y%64) | Dit (y%64 +1) |

FIG. 27

FOR 64 PIXELS

| 118 | 162 | 222 | 194 | 186 | 198 | 50 | 178 | 102 | 10 | 138 | 250 | 18 | 22 | 6 | 170 | 214 | 98 | 242 | 38 | 2 |
| 134 | 226 | 50 | 230 | 74 | 38 | 186 | 210 | 222 | 118 | 114 | 130 | 102 | 222 | 170 | 250 | 82 | 26 | 58 | 182 |
| 70 | 94 | 134 | 162 | 30 | 206 | 82 | 114 | 182 | 170 | 246 | 34 | 22 | 178 | 46 | 118 | 230 | 238 | 122 | 250 |
| 226 | 146 | 166 | 178 | 218 | 182 | 66 | 214 | 50 | 142 | 234 | 38 | 6 | 254 | 246 | 174 | 90 | 22 | 102 | 130 |
| 210 | 190 | 10 | 234 | 178 | 226 | 18 | 206 | 2 | 250 | 138 | 30 | 110 | 38 | 90 | 182 | 6 | 238 | 74 | 242 |
| 34 | 170 | 250 | 54 | 50 | 126 | 62 | 82 | 110 | 26 | 114 | 2 | 94 | 222 | 190 | 166 | 182 | 10 | 70 | 6 |
| 118 | 82 | 90 | 246 | 234 | 170 | 134 | 166 | 74 | 50 | 106 | 214 | 254 | 218 | 102 | 30 | 66 | 86 | 98 | 10 |
| 178 | 202 | 54 | 10 | 6 | 142 | 154 | 246 | 146 | 214 | 210 | 38 | 254 | 62 | 86 | 138 | 130 | 18 | 110 | 182 |

VERTICAL LINE SCREEN

| Dit_r((y/2)%8)(x%64) | Dit_r((y/2)%8)(x%64+1) |
|---|---|
| Dit_r((y/2)%8)(x%64) | Dit_r((y/2)%8)(x%64+1) |

HORIZONTAL LINE SCREEN

| Dit_r((x/2)%8)(x%64) | Dit_r((x/2)%8)(x%64) |
|---|---|
| Dit_r((x/2)%8)(x%64+1) | Dit_r((x/2)%8)(x%64+1) |

AFTER FOREGROUND/BACKGROUND BINARIZATION

C1 BACKGROUND
C2
C3
BLACK CHARACTER
C4: HALFTONE

AFTER GEOMETRIC CORRECTION

AFTER PSEUDO GRAYSCALE PROCESS

IMAGE PROCESSING APPARATUS, IMAGE PROCESSING METHOD, AND RECORDING MEDIUM

CROSS-REFERENCE TO RELATED APPLICATIONS

This patent application is based on and claims priority pursuant to 35 U.S.C. §119(a) to Japanese Patent Application Nos. 2014-263689, filed on Dec. 25, 2014, and 2015-198477, filed on Oct. 6, 2015, in the Japan Patent Office, the entire disclosure of which is hereby incorporated by reference herein.

BACKGROUND

Technical Field

The present invention relates to an image processing apparatus, an image processing method, and an image processing control program stored in a non-transitory recording medium.

Background Art

Misregistration and skew misalignment occur in an electrophotographic image forming apparatus, and front-to-back misalignment in an apparatus that can print on both sides of paper. Hence, correction technologies have already been known which measure the amount of misalignment to make a position correction and a deformation correction on an image in such a manner as to offset the amount of misalignment. Parallel shift, magnification correction, distortion correction, correction of misregistration between colors, front-to-back misalignment correction, and the like are known as examples of such correction technologies.

Among the above correction technologies, a technology for correcting a multi-valued image before a pseudo grayscale process, and a technology for correcting a small value image after the pseudo grayscale process are known. Generally, it is known that the process of correcting a multi-valued image intrinsically has a smaller chance of the occurrence of an abnormality in image quality than the process of correcting a small value image, and can deform an image relatively freely.

However, in a known apparatus that makes an image position correction and deformation correction to a multi-valued image, there arises a problem that a white spot may occur around a character or line drawing to lead to deterioration of the image if the background is other than white.

SUMMARY

Example embodiments of the present invention include an image processing apparatus includes a geometric correction unit to generate a plurality of pieces of pixel value corrected image data having different pixel values based on object information of input image data, a synthesizer to select a pixel value to be applied to each pixel from the plurality of pieces of pixel value corrected image data to generate corrected image synthesized data, and a pseudo grayscale processor to perform a pseudo grayscale process on the corrected image synthesized data.

Other example embodiments of the present invention include an image processing method performed by the image processing apparatus, and a non-transitory recording medium storing a plurality of instructions for causing the image processing apparatus to perform the image processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a schematic configuration diagram of a foreground/background binarization unit according to the first embodiment of the present invention;

FIG. 9 is a schematic diagram explaining a synthesizer according to the first embodiment of the present invention;

FIG. 19 is an entire configuration diagram of an image processing apparatus according to a second embodiment of the present invention;

FIGS. 22A, 22B, and 22C (FIG. 22) are schematic diagrams illustrating examples of images generated by the geometric correction unit according to the second embodiment of the present invention;

FIG. 23 is a schematic configuration diagram of a foreground/background binarization unit according to the second embodiment of the present invention;

FIG. 26 is a schematic diagram illustrating a screen parameter determination method in FIG. 25 according to the second embodiment of the present invention;

FIG. 27 is a diagram explaining parameters for a non-object boundary to be selected by the parameter selector according to the second embodiment of the present invention;

Figure 1:
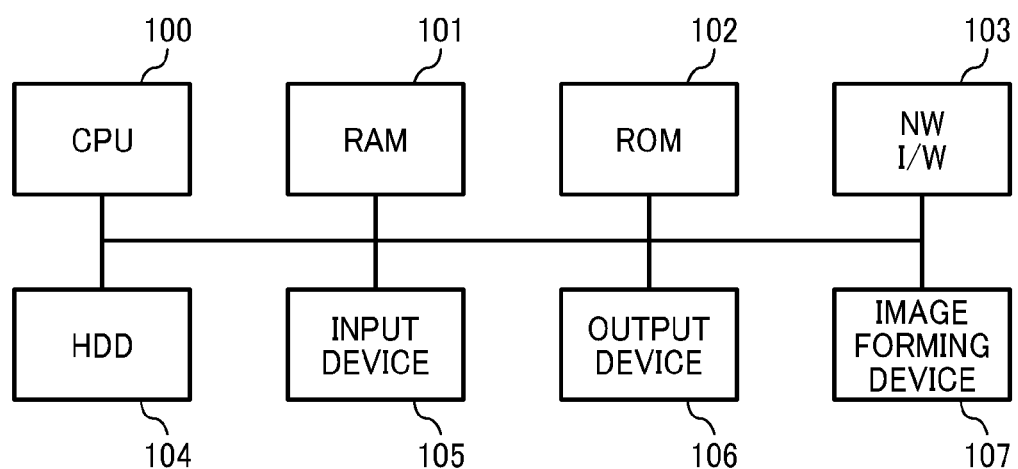
FIG. 1 is a hardware configuration diagram of an image processing apparatus according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF THE INVENTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An image processing apparatus of an embodiment of the present invention is described hereinafter with reference to the drawings. The same reference numerals are assigned to the same or corresponding portions in each drawing. The overlapping descriptions are simplified or omitted as appropriate. The image processing apparatus according to the embodiment may be applied to an image forming apparatus having an image forming function, such as a multifunction peripheral, a printer, or a facsimile machine.

A hardware configuration of the image processing apparatus according to the embodiment is described with reference to FIG. 1. The image processing apparatus according to the embodiment includes a central processing unit (CPU) 100, a random access memory (RAM) 101, a read only memory (ROM) 102, a network interface (NW I/F) 103, a hard disk drive (HDD) 104, an input device 105, an output device 106, an image forming device 107 as basic hardware capable of providing information processing functions.

The CPU 100 is a processor that achieves various processes described below in the image processing apparatus. The CPU 100 reads, onto the RAM 101, various processing programs stored in the ROM 102, and executes them to achieve various processes.

The RAM 101 functions as a working memory for the CPU 100 as described above. Moreover, the RAM 101 also acts as a line memory described later in the embodiment. The ROM 102 is, as described above, a storage where various programs, various parameters required for processes of the image processing apparatus, and the like are stored.

The NW I/F 103 is a network interface for connecting the image processing apparatus to an external device, external network, or the like. For example, a LAN or WAN, or near field communication, NFC, can also be applied as a communication protocol, irrespective of wired or wireless.

The HDD 104 is a storage to store, for example, images, such as input images input from the input device 105, and the like.

The input device 105 is hardware to input original data and the like of an image to be formed by the image forming device 107, and corresponds to, for example, a scanner. The output device 106 includes a display that displays images, and a paper ejection device that ejects paper on which an image has been formed by the image forming device 107. The image forming device 107 is an engine that forms an image based on the above original data and the like.

First Embodiment

In outline, an image processing apparatus according to a first embodiment of the present invention calculates a geometrically corrected pixel value from values based on object information of integer value coordinates at four surrounding points, and binarizes the calculated corrected pixel value. In the embodiment, the binarized data is classified into two: foreground and background. Pixel values are selected in accordance to such classification to prevent the occurrence of an intermediate density pixel at a boundary between the foreground and the background and prevent a white spot after a pseudo grayscale process.

Figure 2:
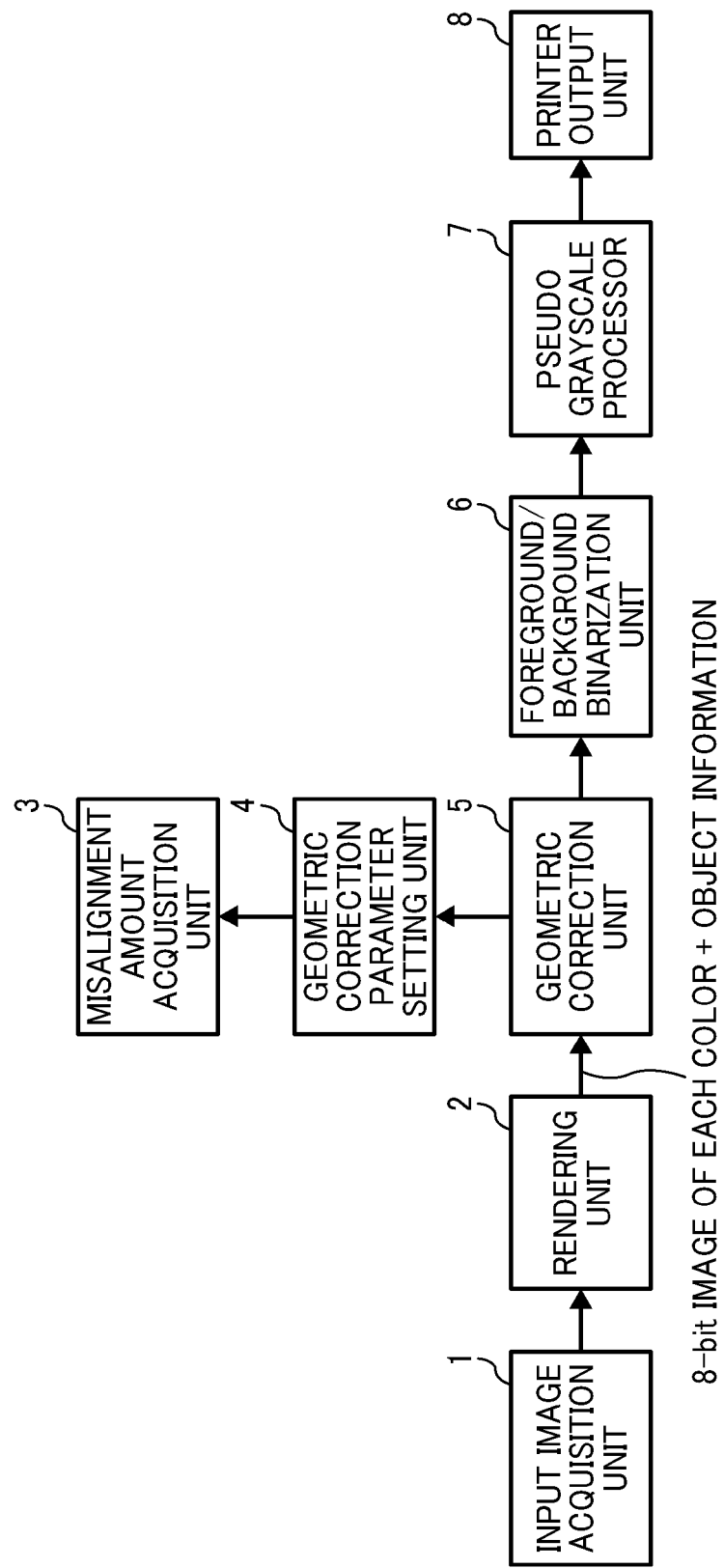
FIG. 2 is an entire configuration diagram of an image processing apparatus according to a first embodiment of the present invention.

An entire configuration of the image processing apparatus according to the first embodiment is described with reference to FIG. 2. The image processing apparatus of the embodiment includes an input image acquisition unit 1, a rendering unit 2, a misalignment amount acquisition unit 3, a geometric correction parameter setting unit 4, a geometric correction unit 5, a foreground/background binarization unit 6, a pseudo grayscale processor 7, and a printer output unit 8.

The input image acquisition unit 1 acquires an input image described in a page description language.

The rendering unit 2 interprets the page description language acquired by the input image acquisition unit 1, and converts the image into a bitmap image having an eight-bit grayscale value for each color. At that time, object information such as a character, a line, a graphic, and an image included in the input image is also interpreted to be assigned to each pixel.

The misalignment amount acquisition unit 3 measures and acquires how coordinate points at four corners change, that is, how much the misalignment is, if printed out without a geometric correction. The following example describes a case in which the amount of misalignment of the back side from the front side is measured, acquired, and corrected. Cross marks are printed at the four corners on the front side and the back side. Their coordinate points are measured to acquire the amount of misalignment between the front side and the back side. The use of a method for automatic measurement with a sensor built in the apparatus, and a method for measuring a printout on a recording medium manually with a ruler and inputting the result is preferred for the measurement.

The geometric correction parameter setting unit 4 calculates mat[0] to mat[7], as geometric correction parameters, from four coordinate points on each side acquired by the misalignment amount acquisition unit 3.

The geometric correction unit 5 generates a plurality of pieces of pixel value corrected image data having different pixel values based on the object information of the input image data. For example, multi-valued corrected image data having a plurality of pixel values is preferred as corrected data generated as the plurality of pieces of pixel value corrected image data.

Furthermore, the geometric correction unit 5 may generate a plurality of pieces of object corrected image data having different pieces of object information based on the object information of the image data. The geometric correction unit 5 preferably calculates a pixel value at a coordinate point obtained by adding a predetermined correction amount to a coordinate point calculated corresponding to a coordinate point of the input image data. Moreover, the geometric correction unit 5 preferably calculates a pixel value of a coordinate point obtained by adding a predetermined correction amount to a coordinate point of the object information of the image data.

mat[0] to mat[7] set as the geometric correction parameters are applied to make a correction in expectation of displacement and distortion that occur upon output. The foreground pixels and the background pixels of the input image are distinguished based on the object information to previously generate a plurality of types of images including a foreground/background synthesis ratio image, which is described below, to use in the foreground/background binarization unit 6. The geometric correction unit 5 according to the embodiment functions as preprosessing of the foreground/background binarization unit 6 in the next block.

The foreground/background binarization unit 6 performs a dot adjustment process on the foreground/background synthesis ratio image, and generates an image whose object boundary has been binarized in the grayscale values of foreground and background.

The pseudo grayscale processor 7 performs a screening process on the image whose object boundary has been binarized in the grayscale values of foreground and background, that is, corrected image synthesized data, performs conversion to binary of white pixels and black pixels, and prints out the image by the printer output unit 8.

The pseudo grayscale processor 7 switches a screen to be applied, in accordance with the object information. If the object information is a character or line, a screen of approximately 300 lines is applied. In a case of a graphic or image, a screen of approximately 200 lines is applied. The object information referred to at this point is also one processed by the geometric correction unit 5 and the foreground/background binarization unit 6, and has a correspondence with the image at that point.

Figure 3:
FIG. 3 is a schematic diagram illustrating an example of object information according to the first embodiment of the present invention.

An example of the object information according to the embodiment is described with reference to FIG. 3. In the embodiment, the object information falls under four types: character, line, graphic, and image. Whether the background of a character or line is white or colored, when the density is uniform, the object information on the background is a graphic.

In the embodiment, the object information uses a representation in two bits. Object information of "01" for a character, "10" for a line, "11" for a graphic, or "00" for an image is assigned to each pixel. Priorities are preferably assigned to the pieces of object information in advance. In the embodiment, the order of decreasing priority is as follows: character, line, graphic, image.

Figure 4:
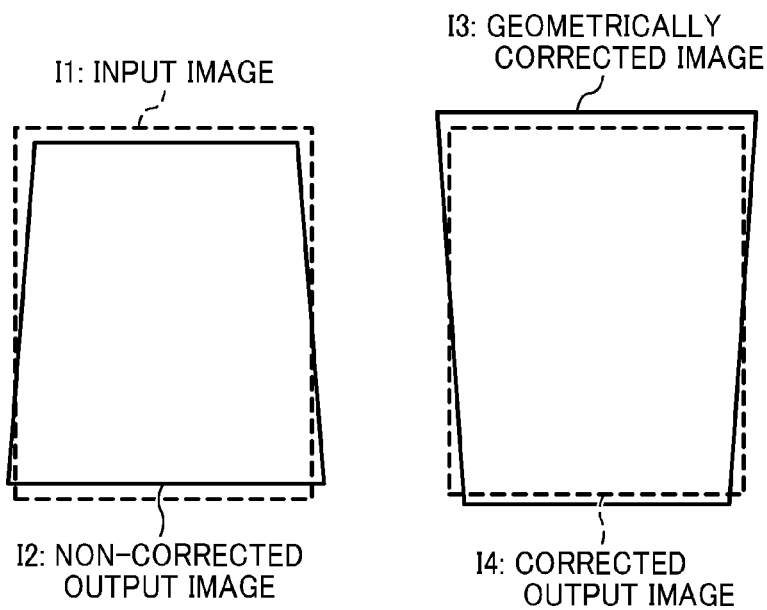
FIG. 4 is a schematic diagram explaining an example of a geometric correction to image distortion according to the first embodiment of the present invention.

Next, geometric correction to image distortion according to the embodiment is described with reference to FIG. 4. On the left side is a solid line representing a non-corrected output image I2 as an example of image distortion occurring when an input image I1 represented by a broken line is printed out without geometric correction. Moreover, on the right side is a broken line representing a printed output image I4 and a solid line representing an image I3 inversely corrected in expectation of image distortion. The inversely corrected image I3 is an image for making the printed output image I4 the same as the input image I1.

In a case of, for example, front-to-back misalignment, the input image I1 is on the front side. The output image I2 is a back-side output image without geometric correction. The inversely corrected image I3 is a geometrically corrected back-side image. The printed output image I4 is an image obtained by printing out the inversely corrected image I3. It is assumed here that no distortion occurs on the front side even after printing out.

In the embodiment, the misalignment amount acquisition unit 3 acquires the coordinates of four corners of the input image I1 and the coordinates of four corners of the output image I2. The geometric correction parameter setting unit 4 makes an inverse correction in expectation of image distortion occurring at the time of printing out, and sets the above-mentioned mat[0] to mat[7] as the geometric correction parameters for generating the image of the inversely corrected image I3.

Figure 5:
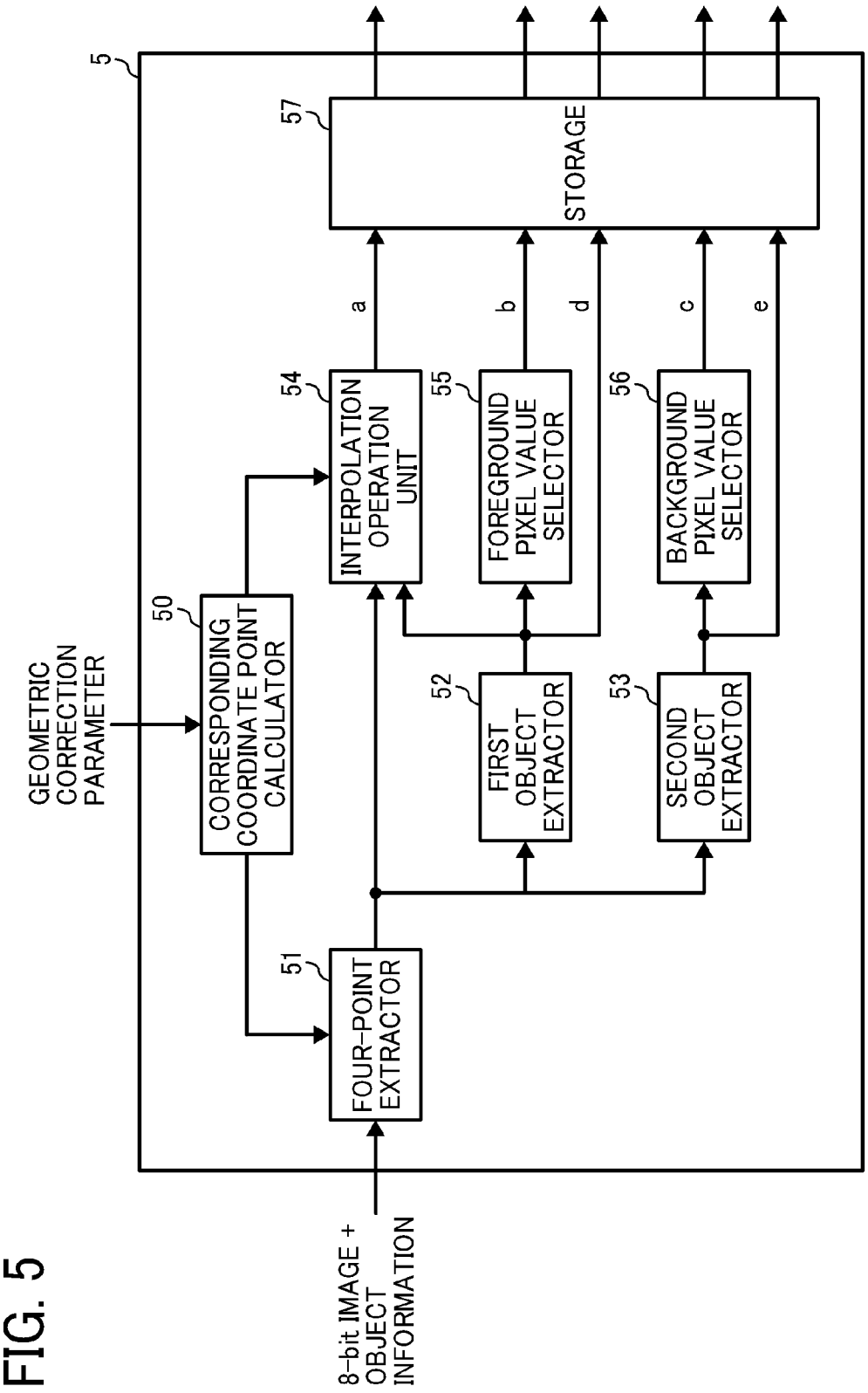
FIG. 5 is a configuration diagram of a geometric correction unit according to the first embodiment of the present invention.

Next, the configuration of the geometric correction unit 5 according to the embodiment is described with reference to FIG. 5. The geometric correction unit 5 includes a corresponding coordinate point calculator 50, a four-point extractor 51, a first object extractor 52, a second object extractor 53, an interpolation operation unit 54, a foreground pixel value selector 55, a background pixel value selector 56, and a storage 57.

The corresponding coordinate point calculator 50 calculates a coordinate point (X, Y) on the input image I1 corresponding to a coordinate point (x, y) on the inversely corrected image I3, applying mat[0] to mat[7] being the geometric correction parameters. The coordinate point (X, Y) is preferably calculated into real numbers having a fractional part.

The four-point extractor 51 extracts four nearby points surrounding the coordinate point (X, Y) based on the values of the integer parts of X and Y.

The first object extractor 52 extracts object information having the highest priority among pieces of object information assigned to the four points, and stores it in line memory of the storage 57 as the pixel values of the coordinate point (x, y) of an object priority image "d" having a high priority. Moreover, the first object extractor 52 transmits, to the downstream foreground pixel value selector 55, the grayscale values of the four points in addition to the extracted object information.

The second object extractor 53 extracts object information having the lowest priority among the pieces of the object information assigned to the four points, and stores it in the line memory of the storage 57 as the pixel value of the coordinate point (x, y) of an object priority image "e" having a low priory. Moreover, the second object extractor 53 transmits, to the downstream background pixel value selector 56, the grayscale values of the four points in addition to the extracted object information.

The interpolation operation unit 54 performs an interpolation operation based on the object information of the four surrounding points, and stores it in the line memory of the storage 57 as the pixel value of the coordinate point (x, y) of a foreground/background synthesis ratio image "a".

The foreground pixel value selector 55 extracts, from the four points, the grayscale value of the pixel having the object information extracted by the first object extractor 52, and stores it in the line memory of the storage 57 as the pixel value of the coordinate point (x, y) of a foreground priority image "b".

The background pixel value selector 56 extracts, from the four points, the grayscale value of the pixel having the object information extracted by the second object extractor 53, and stores it in the line memory of the storage 57 as the pixel value of the coordinate point (x, y) of a background priority image "c". If all the extracted four points are the same object, the pixel values of the foreground priority image "b" and the background priority image "c", and the pixel values of the object priority image "d" having a high priority and the object priority image "e" having a low priority are the same.

Figure 6:
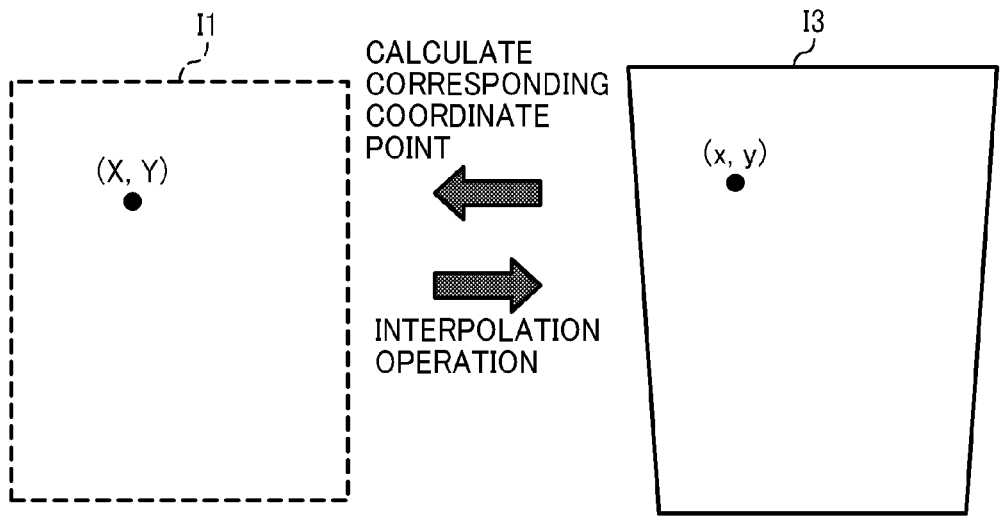
FIG. 6 is a schematic diagram explaining a corresponding coordinate point calculator according to the first embodiment of the present invention.

Next, the corresponding coordinate point calculator 50 according to the embodiment is described with reference to FIG. 6. The corresponding coordinate point calculator 50 applies the following two-dimensional projective transformations, equations 1 and 2, to calculate the coordinate point (X, Y) corresponding to (x, y).

$$X = \frac{mat[0] \cdot x + mat[1] \cdot y + mat[2]}{mat[6] \cdot x + mat[7] \cdot y + 1}$$

$$Y = \frac{mat[3] \cdot x + mat[4] \cdot y + mat[5]}{mat[6] \cdot x + mat[7] \cdot y + 1}$$

A geometric correction in the embodiment is performed by performing an interpolation operation to obtain the grayscale value and object information of the coordinate point (X, Y) in the input image I1, and reducing them as the grayscale value and object information of the coordinate point (x, y) of the inversely corrected image I3.

Figure 7:
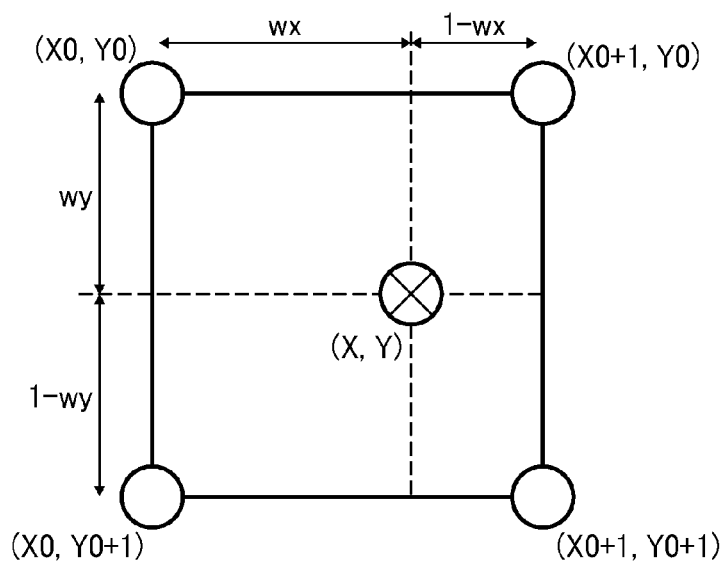
FIG. 7 is a schematic diagram explaining an interpolation operation unit according to the first embodiment of the present invention.

Next, the interpolation operation unit 54 according to the embodiment is described with reference to FIG. 7. Firstly, the four-point extractor 51 extracts four coordinate points in total: (X0, Y0) corresponding to the integer parts of (X, Y), and (X0+1, Y0), (X0, Y0+1), and (X0+1, Y0+1).

The pixel value is calculated by an interpolation operation as in the following equation. Here, weights wx and wy are applied to the pixel values of the four points to calculate the pixel value of (X, Y). The fractional part of X corresponds to wx, and the fractional part of Y to wy.

The pixel value of (x, y)=the pixel value of (X, Y)=the pixel value of (X0, Y0) x (1−wx)×(1−wy)+the pixel value of (X0+1, Y0)×wx×(1−wy)+the pixel value of (X0, Y0+1)×(1−wx)×wy+the pixel value of (X0+1, Y0+1)×wx×wy The interpolation operation performed by the interpolation operation unit 54 in the embodiment is performed not for the pixel value, but based on object information. In other words, the interpolation operation in the embodiment is performed as in the following equation:

The pixel value of (x, y) of the image "a"=the value based on the object information of (X0, Y0)×(1−wx)×(1−wy)+the value based on the object information of (X0+1, Y0)×wx×(1−wy)+the value based on the object information of (X0, Y0+1)×(1−wx)×wy+the value based on the object information of (X0+1, Y0+1)×wx×wy The value based on the object information is 255 if the object information of a given pixel is an object having the highest priority extracted by the first object extractor 52, and is zero if it is object information other than that. However, if all the four points are the same object, zero is forcibly taken.

Next, a schematic configuration of the foreground/background binarization unit 6 according to the embodiment is described with reference to FIG. 8. The foreground/background binarization unit 6 according to the embodiment includes a dot adjustment unit 60 and a synthesizer 61.

The dot adjustment unit 60 generates binarized image data obtained by performing a binarization process on pixel values of a multi-valued corrected image data. More specifically, the dot adjustment unit 60 performs a dot adjustment process on the foreground/background synthesis ratio image "a", referring to the background priority image "c", and generates a dot-adjusted image (a1) being a binary image of 0 (white pixel) or 255 (black pixel). It is assumed here that the foreground/background synthesis ratio image "a" and the background priority image "c" refer to 4×4 pixels.

The synthesizer 61 selects a pixel value to be applied to each pixel from the plurality of pieces of pixel value corrected image data generated by the geometric correction unit 5 to generate corrected image synthesized data.

More specifically, the synthesizer 61 selects the foreground priority image "b" or the background priority image "c" for each pixel based on the dot-adjusted image "a1" being the binarized image data, and generates a corrected eight-bit image.

Similarly, the synthesizer 61 selects the object priority image "d" having a high priority or the object priority image "e" having a low priority for each pixel based on the dot-adjusted image "a1", and generates corrected object information. Here, the corrected eight-bit image and the corrected object information require 2×2 pixels.

The synthesizer 61 is further described with reference to FIG. 9. The figure illustrates, from the left to the right, the pixel value of the dot-adjusted image "a1", the corrected eight-bit image, and the corrected object information, and illustrates a correspondence of a selected corrected eight-bit image and corrected object information to the pixel value of the dot-adjusted image "a1".

The corrected eight-bit image includes a pixel value obtained by selecting the foreground priority image "b" if the pixel value is 255, or selecting the object priority image "c" if the pixel value is zero, based on the dot-adjusted image "a1".

Moreover, the corrected object information includes a pixel value obtained by selecting the object priority image "d" having a high priority if the pixel value is 255, or selecting the object priority image "e" having a low priority if the pixel value is zero, based on the dot-adjusted image "a1".

In other words, in the embodiment, the synthesizer 61 also corrects the object information likewise such that the corrected eight-bit image and the object information completely correspond also after the correction. The determined corrected eight-bit image and corrected object information are both input to the downstream pseudo grayscale processor 7. In the embodiment, a screen to be applied to the corrected eight-bit image is preferably switched based on the corrected object information to perform the pseudo grayscale process.

Figures 10, 11:
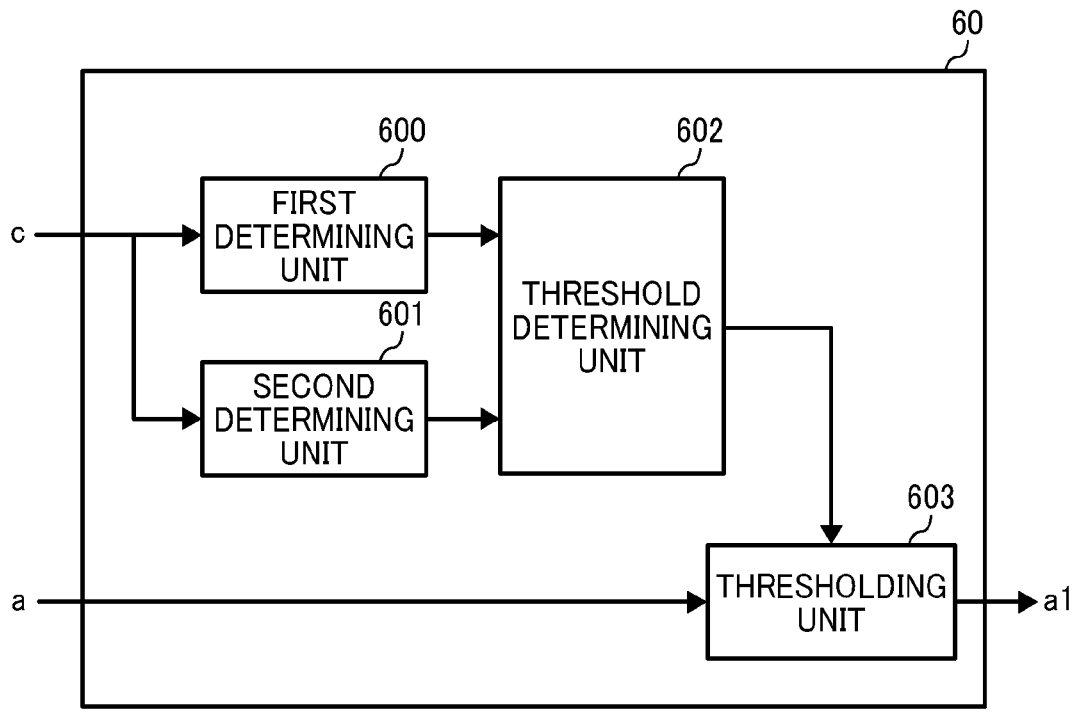
FIG. 10 is a schematic configuration diagram of a dot adjustment unit according to the first embodiment of the present invention.
FIG. 11 is a schematic diagram explaining a first determining unit and a second determining unit according to the first embodiment of the present invention.

Next, the dot adjustment unit 60 is further described with reference to FIG. 10. The dot adjustment unit 60 includes a first determining unit 600, a second determining unit 601, a threshold determining unit 602, and a thresholding unit 603.

The first determining unit 600 determines a screen to be used for the binarization process. More specifically, the first determining unit 600 determines, from the background priority image "c", whether to make a dot adjustment applying a horizontal line screen, make a dot adjustment applying a vertical line screen, or make a dot adjustment applying an oblique line screen.

The second determining unit 601 determines a dot adjustment direction in the binarization process. More specifically, the second determining unit 601 determines, from the background priority image "c", which of upper left, upper right, lower left, and lower right is placed weight to make a dot adjustment when the oblique line screen is applied.

The threshold determining unit 602 determines dither thresholds to be applied to 2×2 pixels in accordance with the determination results of the first determining unit 600 and the second determining unit 601.

The thresholding unit 603 applies the dither threshold determined by the threshold determining unit 602 to the foreground/background synthesis ratio image "a", and converts it to 255 (black pixel) in a case of equal to or greater than the threshold, or to zero (white pixel) in a case of less than the threshold, to output.

The first determining unit 600 and the second determining unit 601 are described in more detail with reference to FIG. 11. It is assumed here that 4×4 pixels of the background priority image "c" is referred to for determination.

The first determining unit 600 calculates an average value of pixels p00, p01, p10, p11, p20, p21, p30, and p31, and sets it as a left average. The first determining unit 600 calculates an average value of pixels p02, p03, p12, p13, p22, p23, p32, and p33, and sets it as a right average.

Moreover, the first determining unit 600 calculates an average value of the pixels p00, p01, p02, p03, p10, p11, p12, and p13, and sets it as an upper average. The first determining unit 600 calculates an average value of the pixels p20, p21, p22, p23, p30, p31, p32, and p33, and sets it as a lower average.

It is assumed here that the absolute value of the difference between the left average and the right average is a left-right difference, and the absolute value of the difference between the upper average and the lower average is an upper-lower difference. The first determining unit 600 determines the application of the vertical line screen if the left-right difference is less than the upper-lower difference, determines the application of the horizontal line screen if the left-right difference is greater than the upper-lower difference, or determines the application of the oblique line screen if the left-right difference is equal to the upper-lower difference.

On the other hand, the second determining unit 601 calculates an average value of the pixels p00, p01, p10, and p11, and sets it as an upper left average. The second determining unit 601 calculates an average value of the pixels p02, p03, p12, and p13, and sets it as an upper right average. Moreover, the second determining unit 601 calculates an average value of the pixels p20, p21, p30, and p31, and sets it as a lower left average. The second determining unit 601 calculates an average value of the pixels p22, p23, p32, and p33, and sets it as a lower right average. The second determining unit 601 determines a direction having the maximum average value as an adjustment direction among upper left, upper right, lower left, and lower right.

Figure 12:
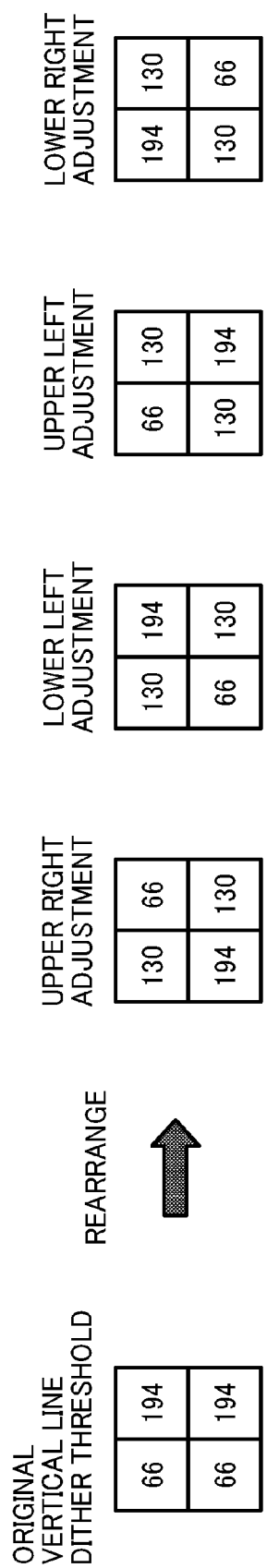
FIG. 12 is a schematic diagram explaining a threshold determining unit according to the first embodiment of the present invention.

The threshold determining unit 602 is described with reference to FIG. 12. Firstly, as a precondition, a dither threshold matrix for the vertical line screen and a dither threshold matrix for the horizontal line screen of a size of approximately 32×32 are prepared in advance.

The threshold determining unit 602 extracts dither thresholds for 2×2 pixels corresponding to given pixel locations from the dither threshold matrix for the vertical line screen if the first determining unit 600 has determined the application of the vertical line screen.

Moreover, the threshold determining unit 602 extracts dither thresholds for 2×2 pixels corresponding to given pixel locations from the dither threshold matrix for the horizontal line screen if the first determining unit 600 has determined the application of the horizontal line screen.

Furthermore, the threshold determining unit 602 extracts dither thresholds for 2×2 pixels corresponding to given pixel locations from the dither threshold matrix for the vertical line screen if the first determining unit 600 has determined the application of the oblique line screen, and makes a rearrangement in accordance with the dot adjustment direction as illustrated in the figure.

The threshold determining unit 602 places a smaller dither threshold in the upper right, and a larger dither threshold in the lower left located in a diagonal direction if the second determining unit 601 has determined that the adjustment direction is the upper right. Moreover, the threshold determining unit 602 places an average value of the smaller and larger dither thresholds in the remaining two. The same shall apply to a case where the adjustment direction is the lower left, the upper left, or the lower right.

Figure 13:
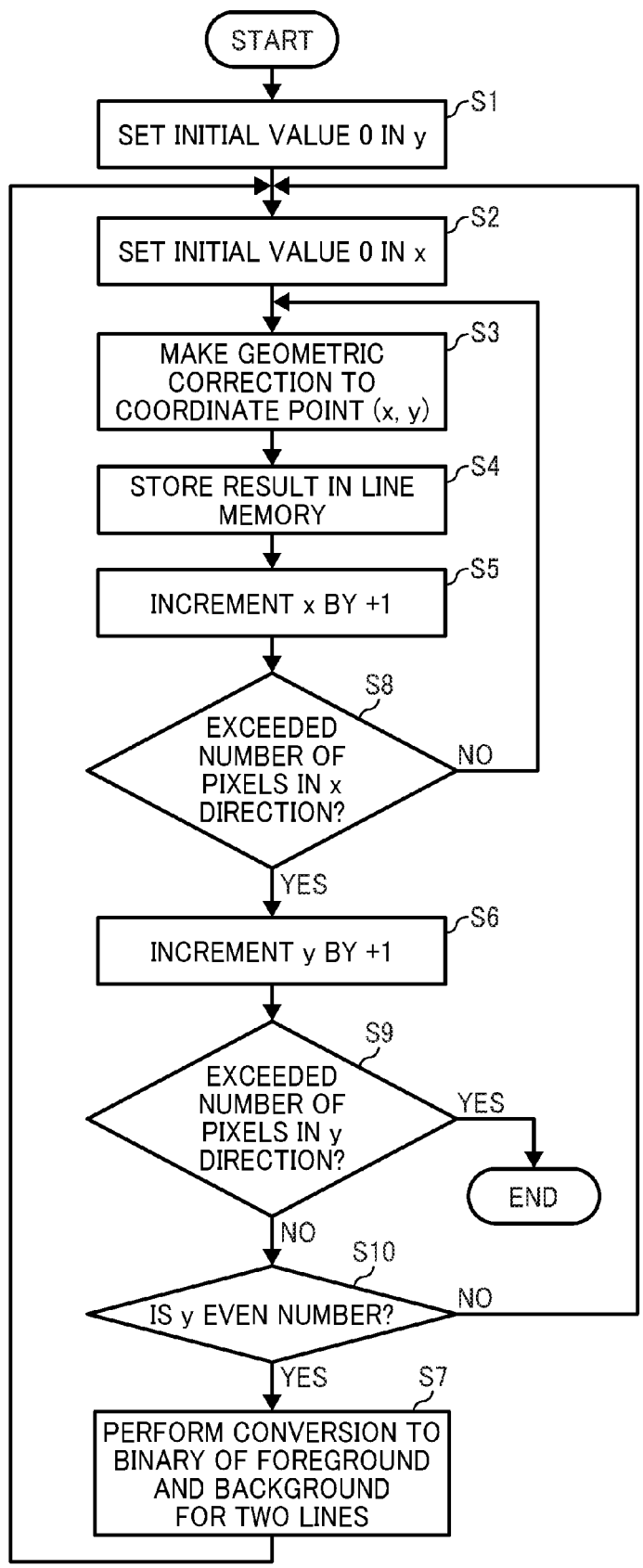
FIG. 13 is a flowchart illustrating a procedure for a geometric correction process according to the first embodiment of the present invention.

Next, a procedure for the geometric correction process according to the embodiment is described with reference to FIG. 13. Firstly, the geometric correction parameter setting unit 4 sets initial values (0, 0) in the geometrically corrected coordinate point (x, y) (step S1, step S2).

Next, the geometric correction unit 5 makes a geometric correction (step S3). The result of the geometric correction process by the geometric correction unit 5 is stored in the line memory of the storage 57 (step S4). The geometric correction unit 5 increments the coordinate point by "+1" in the x direction (step S5). The geometric correction unit 5 repeats the processing of steps S3 to S5 until the coordinate location of x exceeds the number of pixels in the x direction (step S8).

Next the geometric correction unit 5 increments the coordinate point by "+1" in the y direction (step S6). When the coordinate location of y does not exceed the number of pixels in the y direction (step S9, NO), the geometric correction unit 5 determines whether or not y is an even number (step S10). When the geometric correction unit 5 has determined that y is an even number (step S10, YES), the procedure proceeds to the foreground/background binarization unit 6 to acquire two lines' foreground/background binarization result (step S7).

When the geometric correction unit 5 has not determined that y is an even number (step S10, NO), the processing from S2 is repeated. In other words, the geometric correction unit 5 repeats the processing of steps S2 to S6 until the coordinate location of y exceeds the number of pixels in the y direction (step S9). In the storage process of S4, the latest four lines' result may be stored to abandon the older result.

Figure 14A:
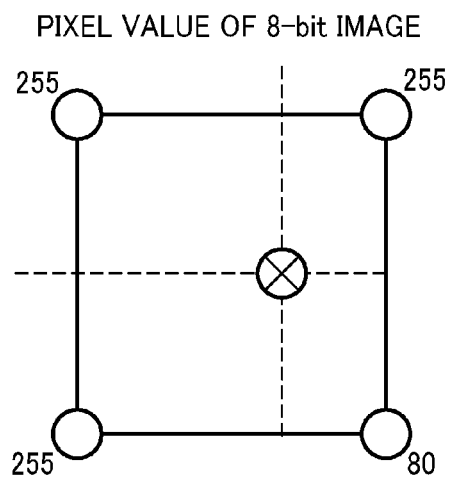
FIGS. 14A and 14B (FIG. 14) are a schematic diagram illustrating a specific example of a geometric correction result according to the first embodiment of the present invention.
Figure 14B:
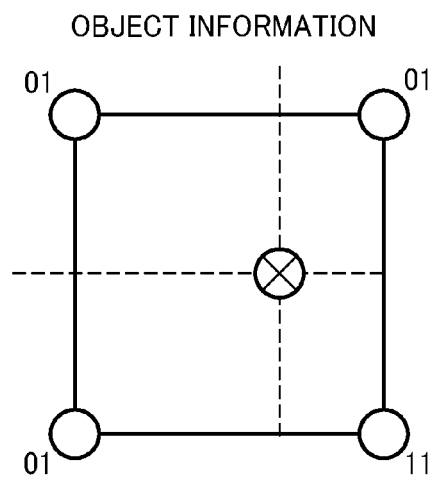

Next, a specific example of the geometric correction process result according to the embodiment is described with reference to FIGS. 14A and 14B (FIG. 14). As illustrated in the figure, when wx=0.75 and wy=0.5, the pixel values of "a" to "e" corresponding to the coordinate point (X, Y) of the input image I1 indicated with an encircled x are as follows, with reference to the pixels at four surrounding points indicated by a circle.

The foreground/background synthesis ratio image "a" is 159 obtained by dropping the fractional part of 255×0.25× 0.5+255×0.75×0.5+255×0.25×0.5=159.375.

The object priority image "d" having a high priority is "01" that represents a character object. The foreground priority image "b" is a pixel value of 255 held by a pixel of the character object.

On the other hand, the object priority image "e" having a low priority is "11" that represents a graphic object. The background priority image "c" is a pixel value of 80 held by a pixel of the graphic object.

Figure 15A:
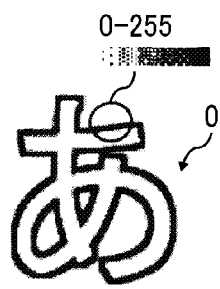
FIGS. 15A, 15B, and 15C (FIG. 15) are a schematic diagram illustrating examples of images generated by the geometric correction unit according to the first embodiment of the present invention.
Figure 15B:
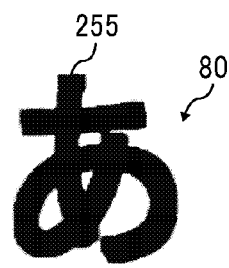
Figure 15C:
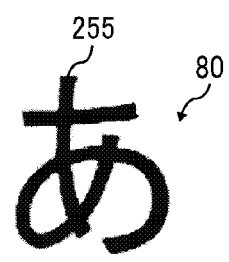

Next, the images "a" to "c" generated by the geometric correction unit 5 according to the embodiment are described with reference to FIGS. 15A to 15C (FIG. 15). In the figure, images presenting Japanese hiragana letter "あ" are used as examples.

The foreground/background synthesis ratio image "a" becomes a multi-valued image having values of 0 to 255 at an edge portion of an object boundary. The foreground priority image "b" becomes an image where the character (or line) has become slightly bolder than the input image. The background priority image "c" becomes an image where the character (or line) has become slightly thinner than the input image.

Moreover, the object priority image "d" having a high priority becomes an object information image corresponding to "b". The object priority image "e" having a low priority becomes an object information image corresponding to "c".

Figure 16:
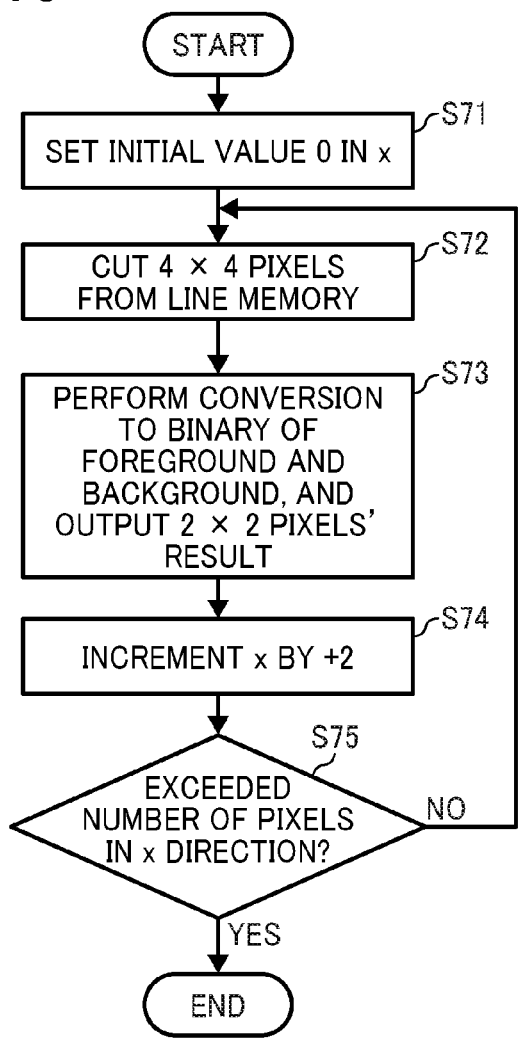
FIG. 16 is a flowchart illustrating a procedure for a foreground/background binarization process according to the first embodiment of the present invention.

Next, the procedure for the processing in the foreground/background binarization unit 6 according to the embodiment is described with reference to FIG. 16. Firstly, the foreground/background binarization unit 6 sets the initial value 0 in x (step S71).

Next, the foreground/background binarization unit 6 cuts 4×4 pixels' geometric correction result from the latest four lines' geometric correction result stored in the line memory of the storage 57 (step S72). At this point in time, the foreground/background binarization unit 6 cuts the results of the coordinate points x−1, x, x+1, and x+2 in the x direction. In a case where there is no coordinate point as in a case of x=0 resulting in x−1=−1, the pixel values of "a" to "e" being the geometric correction results are all assumed to be zero.

The foreground/background binarization unit 6 refers to the 4×4 pixels' geometric correction result to acquire 2×2 pixels' foreground/background binarization result (step S73). The foreground/background binarization unit 6 increments by +2 in the x direction (step S74). The foreground/background binarization unit 6 then repeats the processing of steps S72 to S74 until the coordinate location of x exceeds the number of pixels in the x direction (step S75).

Next, the output of the dot adjustment unit 60 according to the embodiment is described with reference to FIG. 17. Hiragana "あ" is used as an example also here. The dot adjustment unit 60 converts "a" being a multi-valued image having the values of 0 to 255 at an edge portion of an object boundary into a binary image of 0 (white pixel) or 255 (black pixel).

The dot adjustment is conversion from a multi-valued image to a binary image. Therefore, it is preferable to make the dot adjustment by a method in which a screening process is applied to the image "a" according to the direction, such as that the vertical line screen is applied to a horizontal line edge for binarization, or the horizontal line screen is applied to a vertical line edge for binarization.

Next, processed image examples according to the embodiment are described with reference to FIGS. 18A to 18C. In terms of the black line, that is, part of the black character, after the foreground/background binarization process, the synthesizer 61 generates an image using the dot adjustment process result illustrated in FIG. 17. Hence, it is an image having jagged edges. Also in terms of the object information, the crest of the jaggy (hereinafter referred to as the "black character portion") is converted into a character object, and the trough of the jaggy into a graphic object, in accordance with the image.

When the pseudo grayscale process is performed on the image after the foreground/background binarization process, the black character portion stays substantially as it is, that is, is not converted, even if the screen pattern for the character object is applied, since the black character portion has the grayscale value of 255. Therefore, only the colored portion is replaced with the screen pattern for the graphic object. As in the figures, white spots do not occur at the object boundaries.

The jaggies at the edge portions are at a very high frequency on a pixel basis. They cannot be seen by the human eyes at output resolutions of recent printers. In the examples of FIGS. 18A to 18C, there is an effect that it can be seen as if a straight line is drawn on the screen pattern of the colored background.

Figure 18A:
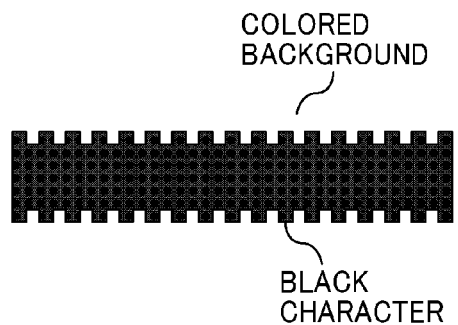
FIGS. 18A, 18B, 18C, and 18D (FIG. 18) are schematic diagrams illustrating processed image examples according to the first embodiment of the present invention.

FIG. 18A is a diagram where a geometric correction is assumed in which the horizontal line constituting the black character is shifted downward or upward by 0.5 pixels, and where the jagged shape accounts for 50% in the upper and lower parts of the line drawing. For example, when a geometric correction is made to shift downward by 0.25 pixels, 75% of the upper part of the line drawing has the jagged shape, and 25% of the lower part has the jagged shape as in FIG. 18B.

Moreover, the jagged pattern is not always uniform. If a geometric correction involving rotation is made, and if the line drawing of the input image originally has an inclination, the shape becomes jagged with gradationally changing ratio as in FIG. 18C.

Figure 17:
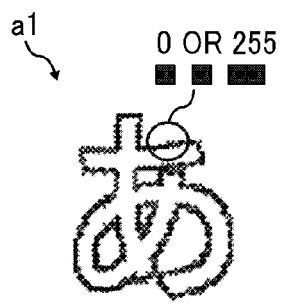
FIG. 17 is a schematic diagram illustrating an example of an output result by the dot adjustment unit according to the first embodiment of the present invention.
Figure 18B:
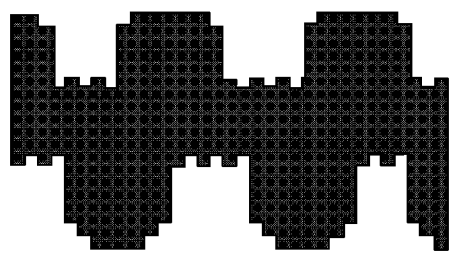
Figure 18C:
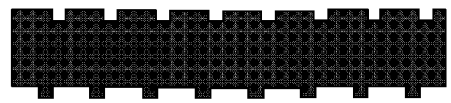
Figure 18D:
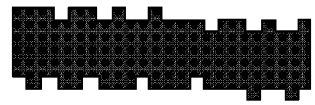

The shape of jaggies is determined by the dot adjustment process result illustrated in FIG. 17. The foreground priority image "b" or the background priority image "c" of FIG. 15 is selected for each pixel based on the dot adjustment process result illustrated in FIG. 17, in accordance with the table illustrated in FIG. 9 to make an image jagged and binarized in the grayscale values of the foreground image, that is, the character in the example, and the background.

Second Embodiment

Next, an image processing apparatus according to a second embodiment of the present invention is described. The descriptions of the configurations that overlap with the first embodiment are omitted.

In the first embodiment, the dot adjustment process is performed on a binary image represented by a halftone after the screening process. Accordingly, the cyclic halftone pattern may be deformed and moire may occur.

The second embodiment is one to which a configuration for preventing the above occurrence of moire is added to the configuration of the first embodiment.

In other words, in the second embodiment, a process against dot defects for preventing white spots is performed at the object boundary such as the boundary between the character and the background, based on the object information, while an uneven pattern having a moire suppression effect is applied at boundaries of halftone dots constituting a halftone being a graphic object to disturb the cyclicity of the halftone dots, and prevent the occurrence of moire.

The entire configuration of the image processing apparatus according to the second embodiment is described with reference to FIG. 19. The configurations of an object boundary determining unit 62 and a parameter selector 63 are newly added between the geometric correction unit 5 and the foreground/background binarization unit 6 in the configuration of the first embodiment illustrated in FIG. 2.

The object boundary determining unit 62 determines, based on the object information, whether or not a pixel block of interest including 2×2 pixels is an object boundary region including a boundary between different objects.

The parameter selector 63 selects parameters for the screen determined by the first determining unit 600 based on whether the coordinates of interest in image data are at an object boundary or a non-object boundary being a boundary of a halftone dot. The parameter selector 63 selects parameters based on the result of the object boundary determining unit 62.

The parameter selector 63 selects parameters for the screen from a group of parameters arranged regularly if the coordinates of interest are at the object boundary. Moreover, the parameter selector 63 selects parameters for the screen from a group of parameters arranged irregularly if the coordinates of interest are at the non-object boundary. The details of each parameter group are described below.

The foreground/background binarization unit 6 performs the dot adjustment process on the foreground/background synthesis ratio image, using the parameters selected by the parameter selector 63, and generates an image binarized in the grayscale values of foreground and background.

The pseudo grayscale processor 7 performs the screening process on the image binarized in the grayscale values of foreground and background to perform conversion to binary of black and white pixels, and prints out the image to the printer output unit 8.

Figure 20:
FIG. 20 is a schematic diagram illustrating examples of object information according to the second embodiment of the present invention.

Next, the object information is described with reference to FIG. 20. For example, in terms of a halftone used when a chart such as a graph is created, dots constituting the halftone, and the background are all graphics. Each of them is assigned as a graphic object to each pixel.

Figure 21:
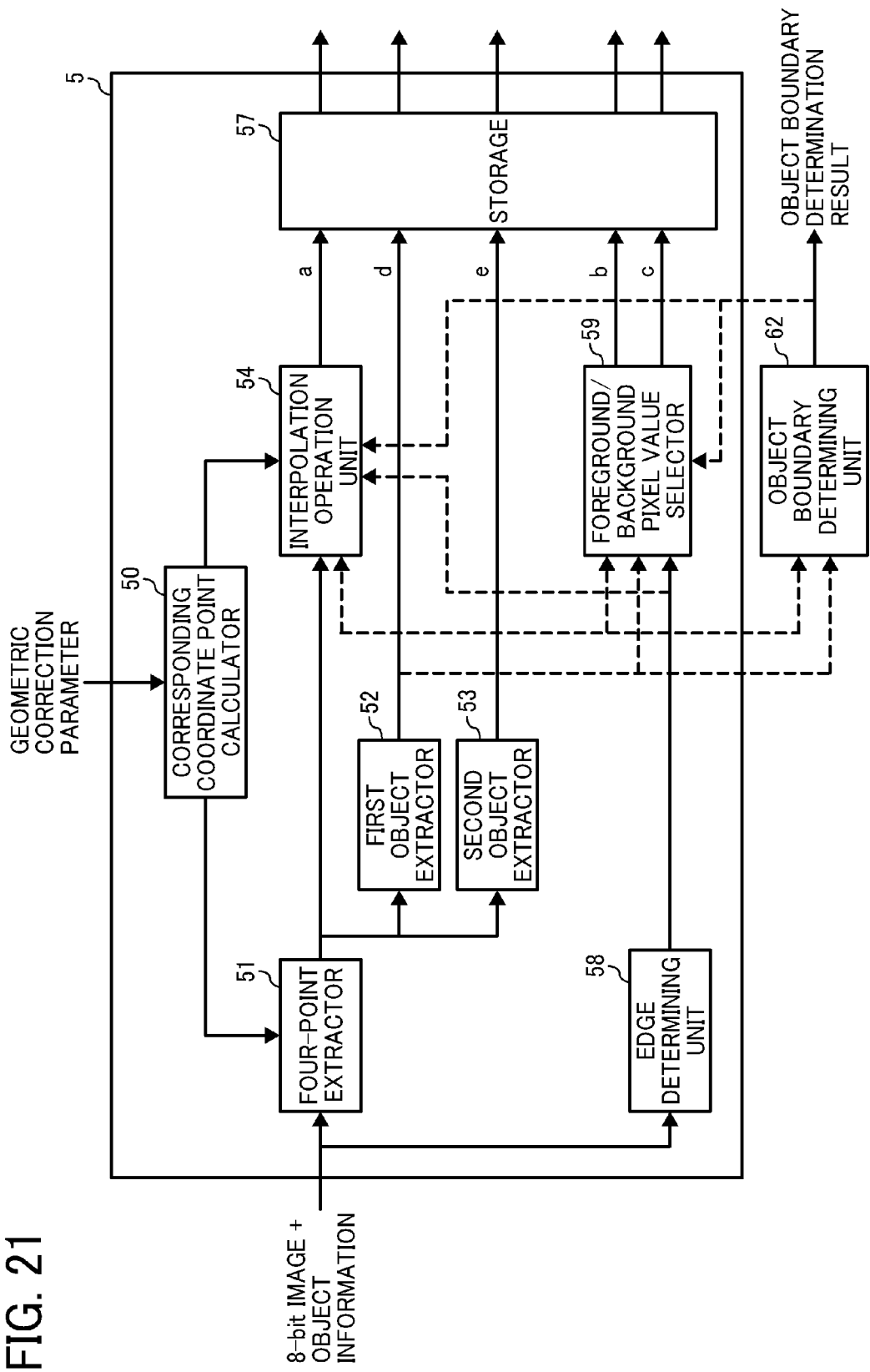
FIG. 21 is a configuration diagram of a geometric correction unit according to the second embodiment of the present invention.

Next, an edge determining unit 58 and a foreground/background pixel value selector 59, which are added to the image processing apparatus according to the second embodiment, and a determination process of the object boundary determining unit 62 are described with reference to FIG. 21.

Here, the interpolation operation unit 54 performs an interpolation operation based on the object information of four surrounding points and an edge determination result.

The edge determining unit 58 determines whether or not a pixel of interest is an edge portion. As a result, the edge determination result, in addition to an eight-bit image and object information, is assigned to each pixel. The method for determining whether or not a pixel of interest is an edge portion refers to 5×5 pixels with the pixel of interest at the center, and determines it as an edge if the difference between the maximum value and the minimum value is equal to or greater than a predetermined value, and as a non-edge if the difference is less than the predetermined value.

The object boundary determining unit 62 determines that a pixel block of interest including four points is an object boundary if the object information extracted by the first object extractor 52 and the object information extracted by the second object extractor 53 respectively indicate different objects. On the other hand, the object boundary determining unit 62 determines that the pixel block of interest including the four points is a non-object boundary if the extracted pieces of object information indicate the same object, that is, if all the four points are the same object.

When the pixel block of interest is an object boundary, the foreground/background pixel value selector 59 extracts, from the four points, the grayscale value of the pixel having the object information extracted by the first object extractor 52, and stores it as the pixel value of the coordinate point (x, y) of the foreground priority image "b" in the line memory of the storage 57. In addition, the foreground/background pixel value selector 59 extracts, from the four points, the grayscale value of the pixel having the object information extracted by the second object extractor 53, and stores it as the pixel value of the coordinate point (x, y) of the background priority image "c" in the line memory of the storage 57.

On the other hand, if the pixel block of interest is a non-object boundary, the grayscale value of an edge pixel is extracted from the four points in accordance with the result of the edge determining unit 58, and is stored as the pixel value of the coordinate point (x, y) of the foreground priority image "b" in the line memory of the storage 57. In addition, the grayscale value of a non-edge pixel is extracted from the four points, and is stored as the pixel value of the coordinate point (x, y) of the background priority image "c" in the line memory of the storage 57. If all the four points are edge pixels, the same value as "b" is set for "c". If all the four points are non-edge pixels, the same value as "c" is set for "b".

In a process flow where the output resolution is higher than the input resolution, resolution conversion is performed to the output resolution before a geometric correction. For example, when the input resolution is 1200 dpi, and misregistration of 0.5 dots is corrected, a halftone pixel occurs at the edge portion. Hence, if the output resolution is 2400 dpi, conversion is performed to 2400 dpi, and then misregistration corresponding to one dot, that is, 0.5 dots at 1200 dpi, is corrected. Consequently, a halftone pixel does not occur at the edge portion. Hence, deterioration in image quality caused by the geometric correction can be reduced.

Resolution conversion is preferably performed between the rendering unit 2 and the geometric correction unit 5.

The process of the interpolation operation unit 54 according to the second embodiment is described with reference to FIG. 7. The interpolation operation performed by the interpolation operation unit 54 according to the second embodiment is performed based on the edge determination result in addition to the object information.

If the extracted pixel block of interest including four points is an object boundary, the operational equation described in the first embodiment is used. The value based on the edge determination result is 255 if a given pixel is an edge, and is zero if the given pixel is a non-edge.

On the other hand, if the extracted pixel block of interest including four points is a non-object boundary, the following equation is used.

The pixel value of (x, y) of the image "a"=the value based on the edge determination result of $(X0, Y0) \times (1-wx) \times (1-wy)$+the value based on the edge determination result of $(X0+1, Y0) \times wx \times (1-wy)$+the value based on the edge determination result of $(X0, Y0+1) \times (1-wx) \times wy$+the value based on the edge determination result of $(X0+1, Y0+1) \times wx \times wy$ Next, the images "a" to "c" generated by the geometric correction unit 5 are described with reference to FIG. 22.

The foreground/background synthesis ratio image "a" becomes a multi-valued image having the values of 0 to 255 at an edge portion of an object boundary of a character or line drawing, or of a non-object boundary of a halftone. The foreground priority image "b" becomes an image where a character (or line) or halftone dots are slightly bolder than the input image. The background priority image "c" becomes an image where a character (or line) or halftone dots are slightly thinner than the input image.

The object priority image "d" having a high priority becomes an object information image corresponding to "b". The object priority image "e" having a low priority becomes an object information image corresponding to "c".

Next, a configuration to which the parameter selector 63 is added to the configuration illustrated in FIG. 8 is described with reference to FIG. 23. The parameter selector 63 selects parameters for the vertical and the horizontal line screen to be applied for dot adjustment, according to the object boundary determination result. The dot adjustment unit 60 refers to "c" for the foreground/background synthesis ratio image "a" to perform the dot adjustment process using the selected parameters, and generates the dot-adjusted image (a1) being a binary image of 0 (white pixel) or 255 (black pixel).

Figure 24:
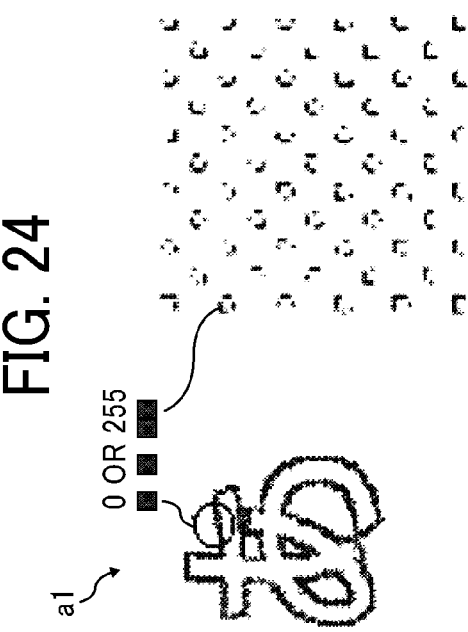
FIG. 24 is a schematic diagram illustrating examples of output results by a dot adjustment unit according to the second embodiment of the present invention.

Next, the output of the dot adjustment unit 60 according to the second embodiment is described with reference to FIG. 24. (a) being a multi-valued image having the values of 0 to 255 at an edge portion of an object boundary of a character, line drawing, or the like, or of a non-object boundary such as a halftone area is converted into a binary image of 0 (white pixel) or 255 (black pixel).

The dot adjustment is conversion from a multi-valued image to a binary image, and accordingly is made by a method in which a screening process is applied to the image (a) according to the direction, such as that the vertical line screen is applied to a horizontal line edge for binarization, or the horizontal line screen is applied to a vertical line edge for binarization.

Next, parameters for an object boundary to be selected by the parameter selector 63 are described with reference to FIG. 25. If a pixel block of interest is an object boundary, parameters for the vertical and the horizontal line screen to be applied in dot adjustment are selected from a parameter array illustrated in FIG. 25.

Figure 25:
FIG. 25 is a diagram explaining parameters for an object boundary to be selected by a parameter selector according to the second embodiment of the present invention.

If Dit(n) where n=0, . . . , 63, the parameter array of FIG. 25 is configured as a regular parameter group in such a manner as to be an array where elements having n of an even number take a numerical value less than 128, and elements having n of an odd number take a numerical value equal to or greater than 128, in other words, small values and large values are alternately arranged. For example, if Dit(n) is applied as it is to a horizontal line of a pixel value 128 to perform thresholding, 255, 0, 255, 0, 255, 0, 255, 0, . . . are output to result in a high-frequency black and white pattern. Dit(n) is a parameter array aiming for conversion to a high-frequency black and white pattern (uneven pattern).

FIG. 26 illustrates the vertical line screen and the horizontal line screen, which are applied to four points of geometrically corrected coordinates (x, y), (x+1, y), (x, y+1), and (x+1, y+1) (x and y are even numbers). x %64 is a remainder of x divided by 64. Therefore, the parameter selector 63 is required to select four: Dit (x %64), Dit (x %64+1), Dit (y %64), and Dit (y %64+1) from the parameter array of FIG. 25.

Next, parameters for a non-object boundary to be selected by the parameter selector 63 are described with reference to FIG. 27. If a pixel block of interest is a non-object boundary, parameters for the vertical and the horizontal line screen to be applied in dot adjustment are selected from a parameter array illustrated in FIG. 27.

In FIG. 27, if Dit_r(m)(n) where m=0, . . . , 7 and n=0, . . . , 63, the parameter array is configured as an irregular parameter group such that numerical values are irregularly arranged in each row. For example, when Dit_r (m)(n) is applied as it is to a horizontal line of a pixel value 128 to perform thresholding, if the parameters in the first row is used, a pattern is output where 32 out of 64 pixels are white and 32 pixels are black. Also if the parameters in another row is used, the ratio of black and white is the same. However, the pattern is different from the case where the first row is used.

Moreover, in any case, the output is not regular, like 0, 255, 0, 255, 0, 255, 0, 255, . . . , as in FIG. 26. Dit_r(m)(n) is a parameter array aiming for conversion to an irregular black and white pattern having excellent dispersibility, that is, an uneven pattern.

Figures 28, 29:
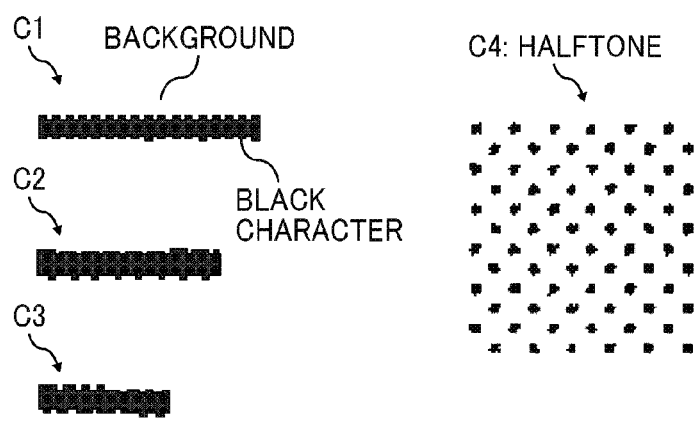
FIG. 28 is a schematic diagram illustrating a screen parameter determination method in FIG. 27 according to the second embodiment of the present invention.
FIG. 29 is a schematic diagram illustrating processed image examples according to the second embodiment of the present invention.

FIG. 28 illustrates the vertical line screen and the horizontal line screen, which are applied to four points of the geometrically corrected coordinates (x, y), (x+1, y), (x, y+1), and (x+1, y+1) (x and y are even numbers).

Therefore, the parameter selector 63 is required to select four: Dit_r((y/2)%8)(x %64), Dit_r((y/2)%8)(x %64+1), Dit_r((x/2)%8)(y %64), and Dit_r((x/2)%8)(y %64+1), from the parameter array of FIG. 27.

For example, if x=2 and y=4, Dit_r(2)(2) and Dit_r(2)(3) are selected as the parameters for the vertical line screen, and Dit_r(1)(4) and Dit_r(1)(5) as the parameters for the horizontal line screen.

It is also conceivable that if thresholding is performed using the parameters selected here, lines cut in two-dot lengths are formed. However, the parameters selected here are applied to parts of a one-dot width at an edge portion. Therefore, there actually arises no case where lines cut in two-dot lengths are formed on an output image.

Next, the threshold determining unit 602 according to the second embodiment is described with reference to FIG. 10. If the first determining unit 600 has determined that the vertical line screen is applied, the parameters for the vertical line screen selected by the parameter selector 63 are determined as thresholds to be applied in the thresholding unit 603.

On the other hand, if the first determining unit 600 has determined that the horizontal line screen is applied, the parameters for the horizontal line screen selected by the parameter selector 63 are determined as thresholds to be applied in the thresholding unit 603.

If the first determining unit 600 has determined that the oblique line screen is applied, those obtained by rearranging the parameters for the vertical line screen selected by the parameter selector 63 in accordance with the dot adjustment direction are determined as thresholds to be applied in the thresholding unit 603.

Next, processed image examples according to the second embodiment are described with reference to FIG. 29. In terms of black lines, that is, parts of black characters, of C1 to C3, images are generated by the synthesizer 61 using the dot adjustment result of FIG. 24 and accordingly become images having jagged edge portions. Also in terms of the object information, the crest of the jaggy, in other words, a black pixel, is converted into a character object, and the trough of the jaggy to a graphic object, in accordance with the image.

C1 illustrates an example case of a geometric correction where the horizontal line constituting the black character is shifted downward (or upward) by 0.5 pixels. The jagged shape accounts for 50% of the upper part and lower part of the line drawing. C2 illustrates an example case of a geometric correction of a downward shift by 0.25 pixels. The jagged shape accounts for 75% of the upper part of and 25% of the lower part of the line drawing.

Moreover, the jagged pattern is not always uniform. If a geometric correction involving rotation as in C3 is made, and if the line drawing of the input image originally has an inclination, the shape becomes jagged with gradationally changing ratio. In this manner, the edge portions are made uneven to enable a change in the barycenter of the line in units less than one dot.

C1 to C3 are processed using the parameters for an object boundary described in FIG. 25. Therefore, a relatively high-frequency uneven pattern is given to the edge portions. The unevenness is at a level that cannot be seen by the human eyes at the output resolutions of the recent printers. It should be seen as if a straight line is drawn. Therefore, there is an effect to prevent a wobbly line due to image distortion.

C4 illustrates a processed image of a halftone portion. Making the edges of the halftone dots uneven to change the barycenter in units less than one dot is the same. However, the process is performed using parameters for a non-object boundary described in FIG. 27. Accordingly, not a regular uneven pattern as in C1 and C2 but an irregular uneven pattern is given. Therefore, there is an effect to prevent the occurrence of moire.

Moire is a pattern occurring due to interference when cyclic patterns have different cyclicity. One of the cyclic patterns having cyclicity in the embodiment is a halftone, and the other is the uneven pattern mentioned here. There are halftones having different cycles. Accordingly, there is also a halftone having a different cycle from the cycle of the uneven pattern. There arises a case where moire occurs.

Hence, in the embodiment, the cyclicity of the uneven pattern being the one of the interference occurrence factors is disturbed. Accordingly, interference does not occur. "Irregular" here is used with a meaning to the degree of disturbed cyclicity or non-cyclic. Moreover, in the embodiment, the example has been described in which a group of parameters arranged regularly and a group of parameters arranged irregularly are prepared in advance. However, parameters caused to occur sequentially using a general random number generation method may be used.

Figure 30A:
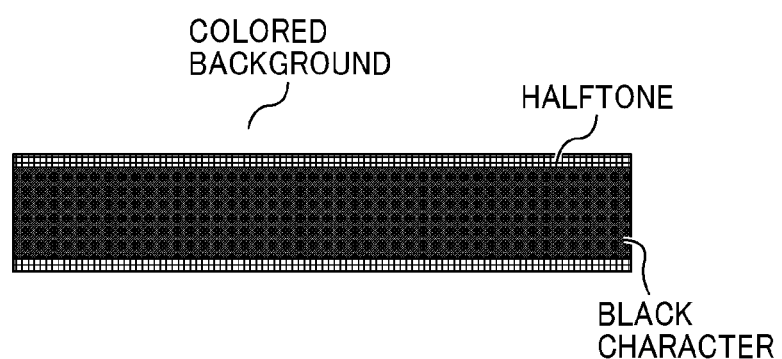
FIGS. 30A and 30B (FIG. 30) are a schematic diagram illustrating comparative examples of image processing.
Figure 30B:
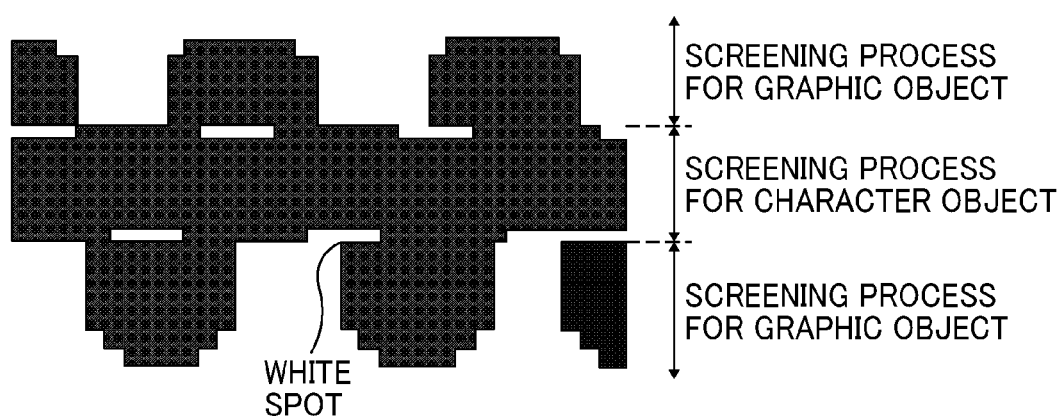

For the descriptive purposes, comparative processed image examples are described with reference to FIGS. 30A and 30B. The foreground/background binarization unit 6 is not provided here. Hence, an intermediate density pixel occurs at a boundary between foreground (black character) and (colored) background after geometric correction. Therefore, after the pseudo grayscale process, the intermediate density pixel is replaced with a screen pattern for a character object, and the colored portion with a screen pattern for a graphic object. A white spot occurs at the boundary between the screen patterns having different lines per inch.

As described above, according to at least one of the above-described embodiments, it becomes possible to prevent the occurrence of a white spot around a character or line drawing in an apparatus that makes an image position correction and deformation correction to a multi-valued image even if the background is other than white.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An image processing apparatus comprising:
    a geometric correction unit configured to generate a plurality of pieces of pixel value corrected image data having different pixel values based on object information of input image data;
    a synthesizer configured to select a pixel value to be applied to each pixel from the plurality of pieces of pixel value corrected image data to generate corrected image synthesized data; and
    a pseudo grayscale processor configured to perform a pseudo grayscale process on the corrected image synthesized data,
    wherein the geometric correction unit is further configured to determine a pixel value of coordinates of interest in the image data corresponding to a geometrically corrected pixel, based on object information of coordinate points in the surrounding of the coordinates of interest and a priority level of each piece of the object information, and then generate the plurality of pieces of pixel value corrected image data having different pixel values.

2. The image processing apparatus according to claim 1, further comprising an edge determining unit configured to acquire edge information of a pixel of interest in the image data, wherein
    when the coordinates of interest is at an object boundary, the geometric correction unit determines the pixel value of the coordinates of interest in the image data based on the object information of the coordinate points in the surrounding of the coordinates of interest and the priority level of each piece of the object information to generate the pixel value corrected image data, and
    when the coordinates of interest is at a non-object boundary, the geometric correction unit determines the pixel value of the coordinates of interest in the image data based on edge information of the coordinate points in the surrounding of the coordinates of interest to generate the pixel value corrected image data.

3. The image processing apparatus according to claim 1, further comprising:
    a dot adjustment unit configured to perform a binarization process on a pixel value of multi-valued corrected image data to generate binarized image data,
    wherein the geometric correction unit determines the pixel value of the coordinates of interest based on the object information of the coordinate points in the surrounding of the coordinates of interest and coordinate information of the coordinates of interest to generate the multi-valued corrected image data for processing by the dot adjustment unit, and
    the synthesizer selects a pixel value to be applied to each pixel from the plurality of pieces of pixel value corrected image data based on the binarized image data generated by the dot adjustment unit, to generate corrected image synthesized data.

4. The image processing apparatus according to claim 3, wherein
    when the coordinates of interest is at an object boundary, the geometric correction unit determines the pixel value of the coordinates of interest in the image data based on the object information of the image data to generate the multi-valued corrected image data, and
    when the coordinates of interest is at a non-object boundary, the geometric correction unit determines the pixel value of the coordinates of interest in the image data based on edge information of the image data to generate the multi-valued corrected image data.

5. The image processing apparatus according to claim 3, wherein the dot adjustment unit includes a first determining unit configured to determine a screen to be used for the binarization process.

6. The image processing apparatus according to claim 3, wherein the dot adjustment unit includes a second determining unit configured to determine a dot adjustment direction in the binarization process.

7. The image processing apparatus according to claim 4, further comprising a parameter selector configured to select a parameter specifying a screen to be used by the dot adjustment unit from a predetermined parameter group based on whether the pixel of interest in the image data is at an object boundary or a non-object boundary.

8. The image processing apparatus according to claim 7, wherein, when the pixel of interest in the image data is at an object boundary, the parameter selector selects a parameter specifying a screen to be used by the dot adjustment unit from a group of parameters arranged regularly, or sequentially generates a parameter specifying a screen to be used by the dot adjustment unit.

9. The image processing apparatus according to claim 7, wherein, when the pixel of interest in the image data is at a non-object boundary, the parameter selector selects a parameter specifying a screen to be used by the dot adjustment unit from a group of parameters arranged irregularly, or sequentially generates a parameter specifying a screen to be used by the dot adjustment unit.

10. The image processing apparatus according to claim 1, wherein
    the geometric correction unit corrects distortion in the image data, and generates a plurality of pieces of object corrected image data having different pieces of object information based on the object information of the image data,
    the synthesizer selects a pixel value and object information to be applied to each pixel from the plurality of pieces of pixel value corrected image data and the plurality of pieces of object corrected image data based on the binarized image data binarized by the dot adjustment unit to generate the corrected image synthesized data, and
    the pseudo grayscale processor determines a screen to be used for a pseudo grayscale process to be performed on the corrected image synthesized data generated by the synthesizer, based on object information of the corrected image synthesized data.

11. An image processing method comprising:
- determining a pixel value of coordinates of interest in input image data corresponding to a geometrically corrected pixel, based on object information of the input image data of coordinate points in the surrounding of the coordinates of interest and a priority level of each piece of the object information and then generating a plurality of pieces of pixel value corrected image data having different pixel values;
- selecting a pixel value to be applied to each pixel from the plurality of pieces of pixel value corrected image data to generate corrected image synthesized data; and
- performing a pseudo grayscale process on the corrected image synthesized data.

12. A non-transitory recording medium which, when executed by one or more processors, cause the processors to perform an image processing method comprising:
- determining a pixel value of coordinates of interest in input image data corresponding to a geometrically corrected pixel, based on object information of the input image data of coordinate points in the surrounding of the coordinates of interest and a priority level of each piece of the object information and then generating a plurality of pieces of pixel value corrected image data having different pixel values;
- selecting a pixel value to be applied to each pixel from the plurality of pieces of pixel value corrected image data to generate corrected image synthesized data; and
- performing a pseudo grayscale process on the corrected image synthesized data.

* * * * *